(12) United States Patent
Chen (10) Patent No.: US 7,300,150 B1
(45) Date of Patent: Nov. 27, 2007

(54) TOOL-FREE ADJUSTABLE EYEGLASSES WITH VARIEGATED TEMPLES

(76) Inventor: Joy Chen, No. 24, Lane 420, Sec. 1, Chien Kang Rd., Tainan City (TW)

( * ) Notice: Subject to any disclaimer, the term of this patent is extended or adjusted under 35 U.S.C. 154(b) by 0 days.

(21) Appl. No.: 11/623,071

(22) Filed: Jan. 13, 2007

(51) Int. Cl.
G02C 5/14 (2006.01)

(52) U.S. Cl. ...................... 351/120; 351/156

(58) Field of Classification Search ............... 351/120, 351/156, 111, 118, 119, 157, 158, 41
See application file for complete search history.

(56) References Cited

U.S. PATENT DOCUMENTS 6,364,479 B1 * 4/2002 Wu .................... 351/120
6,837,579 B1 * 1/2005 Chen .................. 351/120
7,104,646 B2 * 9/2006 Yang .................. 351/120

* cited by examiner

Primary Examiner—Hung X. Dang
(74) Attorney, Agent, or Firm—Banger Shia (57) ABSTRACT

A pair of eyeglasses with a unitary appearance by having the connecting piece concealed includes three parts: a lens-seat, two connecting pieces, and two temple assemblies. The unique alignment of the three parts in assembly allows for variegated design in the temple assembly, which can also be a restraining buckle strap. The adjustable temple assemblies can be easily assembled with the lens-seat without tools, which is rotatable relative to the lens-seat via different positions in meshing between the parallel teeth of the retaining piece (extending outwards from the temple assembly), and the protruding teeth of the connecting piece, thereby permitting an optimal adjustment of an inclination angle of the temple assembly.

5 Claims, 8 Drawing Sheets

TOOL-FREE ADJUSTABLE EYEGLASSES WITH VARIEGATED TEMPLES

BACKGROUND OF THE INVENTION

1. Field of the Invention

This invention relates to eyeglasses, and more particularly to eyeglasses with a unitary appearance including two angle adjustable temples, which can be easily assembled with the lens-seat without tools and also allows for variegated design in the temple body.

2. Description of the Related Art

Most conventional eyeglasses come with angle adjustable temples for a better or more focused vision view. Nevertheless, the specific design of the temples for being adjustable relative to the lens-seat can be relatively rough in appearance and also incurs inconvenience in assembly.

Figure 7:
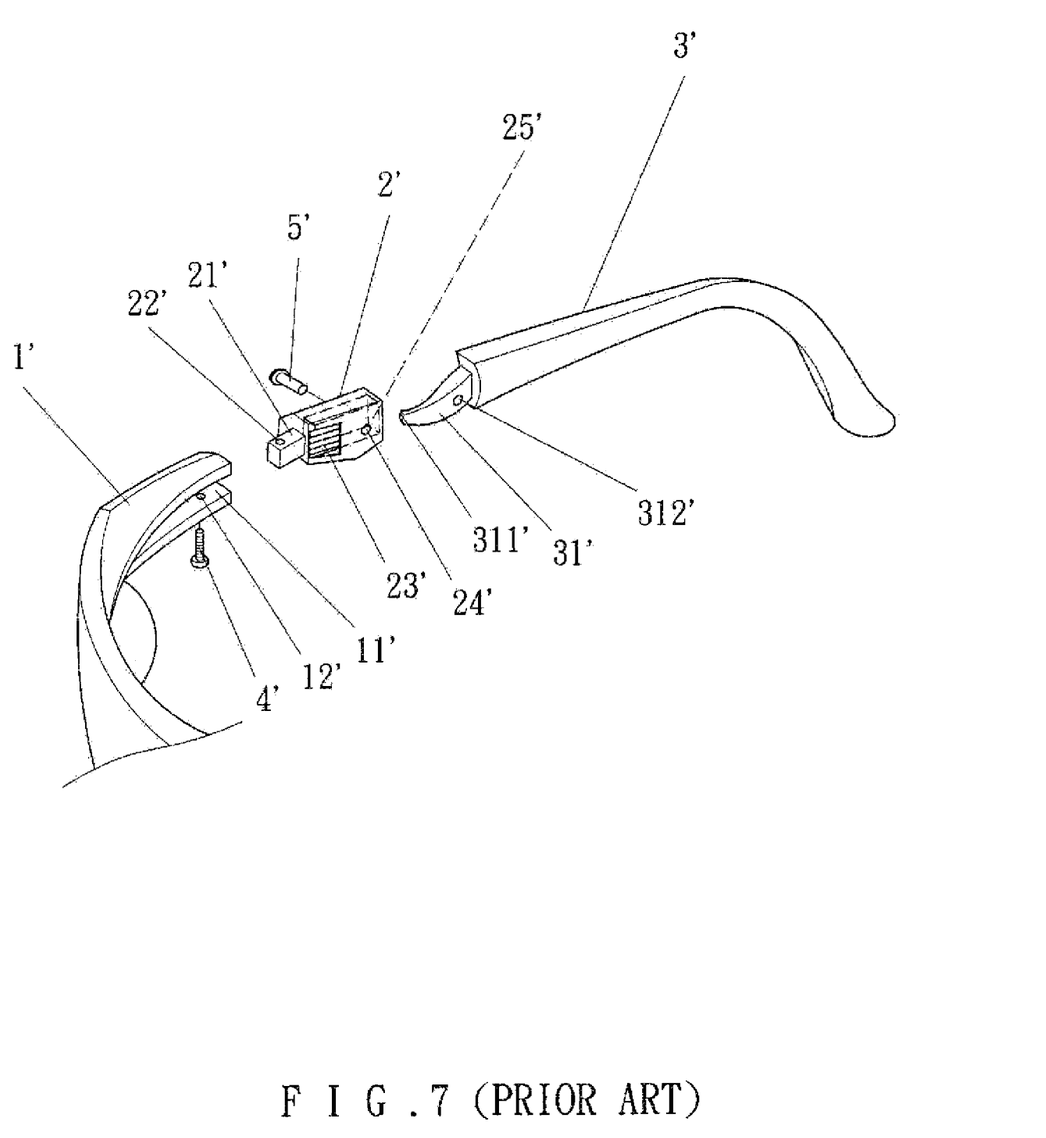
FIG. 7 illustrates the essential parts in assembling a pair of conventional adjustable eyeglasses.
Figure 8:
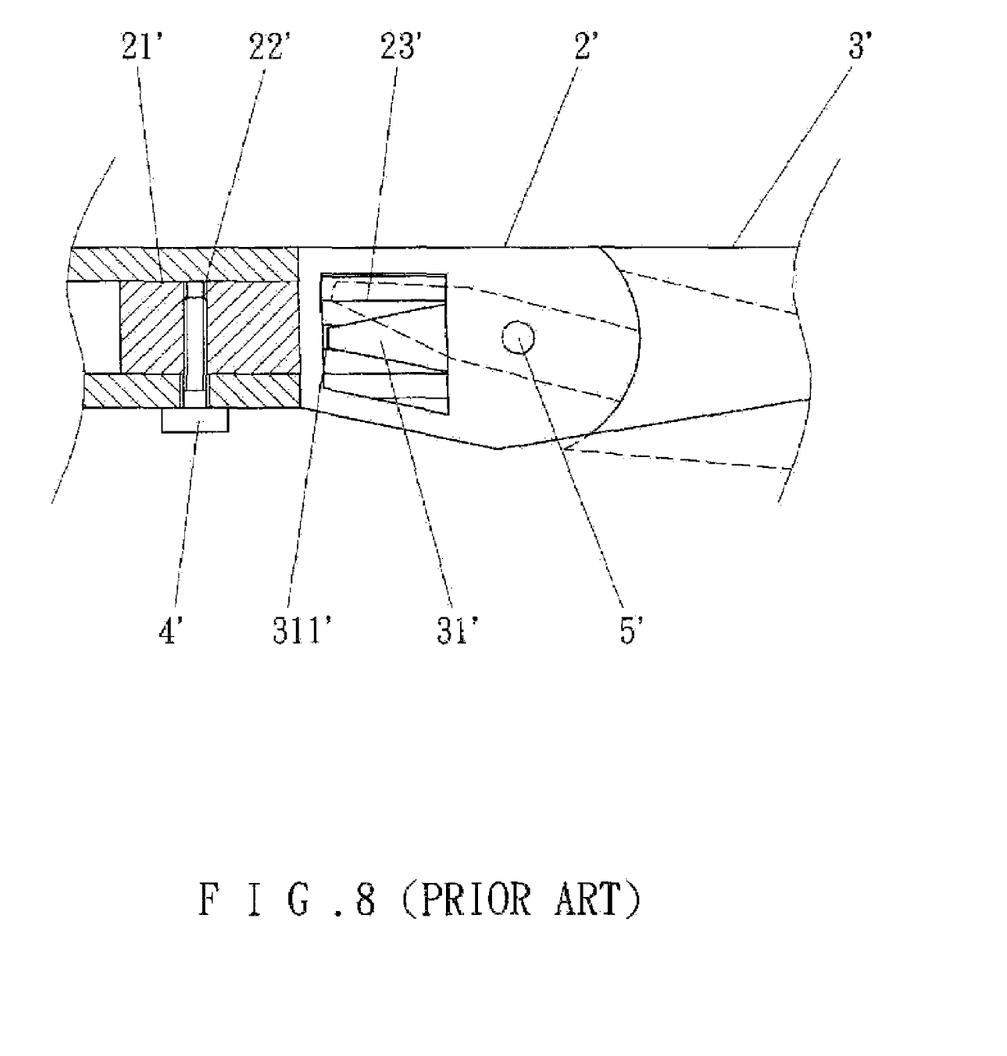
FIG. 8 is a cross-sectional view of the eyeglasses shown in FIG. 7, illustrating rotation of the temple relative to the lens-seat.

FIG. 7 shows a pair of conventional eyeglasses, of which the lens-seat 1' is to be connected to the temple 3' by a locking piece 2'. At each free end of the lens-seat 1' is defined a receiving space 11', wherein a pivot through-bore 12' is formed on the lower surface thereof. For the locking piece 2', a rectangular protrusion 21' extends outwardly from one side thereof towards the free end of the lens-seat 1', with a vertical aperture 22' disposed therein. The vertical aperture 22' engages the free end of the lens-seat 1' via a vertical pin 4', inserted though the vertical through-bore 12'. Furthermore, a receiving slot 25' is configured within the locking piece 2' for accommodating the curved insertion head 31', which is integrally formed with the temple 3' for joining the locking piece 2'. In assembly, the curved insertion head 31' passes through the receiving slot 25' and meshes with a plurality of protruding teeth 23' aligned along the inner side of the locking piece 2'; while the pivot pin 5' runs through the side through-hole 312' of the curved insertion head 31' for positioning. When in use, the temple 3' of the eyeglasses shown in FIGS. 7 and 8 can rotate along the pivot pin 5'

A disadvantage associated with the aforementioned prior an arises from the inconvenience in assembly which requires specially selected tools for locking pins in place. Another disadvantage is the less appealing look of the product due to the visible locking piece (by which the temple connects to the end portion of the lens receiver). In addition, the locking piece may take up a substantially long portion of the temple, leaving less room for designing the temple, as U.S. Pat. No. 7,104,646 and U.S. Pat. No. 6,883,914 disclosed. A third disadvantage comes from the locking of a plurality of protruding teeth 23' with the insertion head 311', which when out of mesh (because of the improper locking of the pivotal pin 5') will effect adversely the angular adjustment of the temple relative to the lens-seat.

SUMMARY OF THE INVENTION

It is the goal of this invention to provide some feasible solutions for the defects encountered in the aforementioned prior arts. Accordingly, it is an object of the present invention to provide a pair of tool-free adjustable eyeglasses with an invisible locking piece and with versatile designs in temple assemblies.

A pair of adjustable eyeglasses inevitably include three essential parts: a lens-seat for housing two lens, two locking pieces, and two temple assemblies. The present invention is realized by assembling these three elements in such a way that the locking piece takes up little length of the temple assembly, while leaving substantial room for functionally differentiated temple assemblies. In addition, the locking piece is configured to be firmly housed and concealed by the other two essential parts (i.e. the lens-seat and the temple assembly), giving the eyeglasses a unitary look.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENT

Parts or elements referred to in the invention with a symmetrical structure and an identical function are designated by the same reference numerals throughout the entire disclosure.

Figure 1:
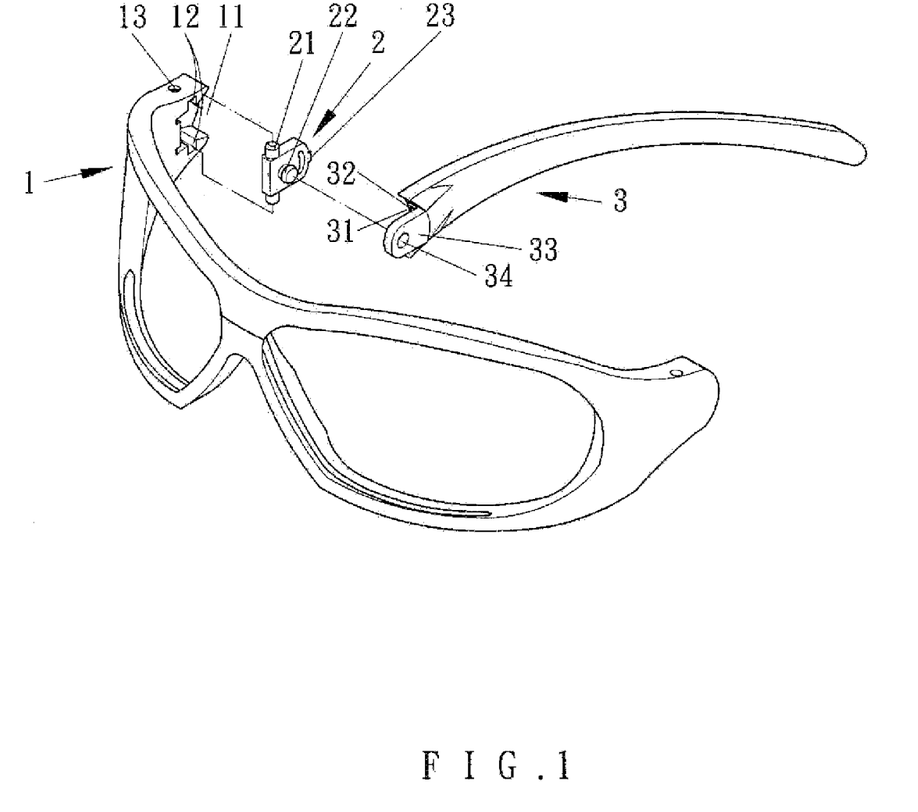
FIG. 1 is an exploded perspective view of the first preferred embodiment in accordance with the present invention.
Figure 2:
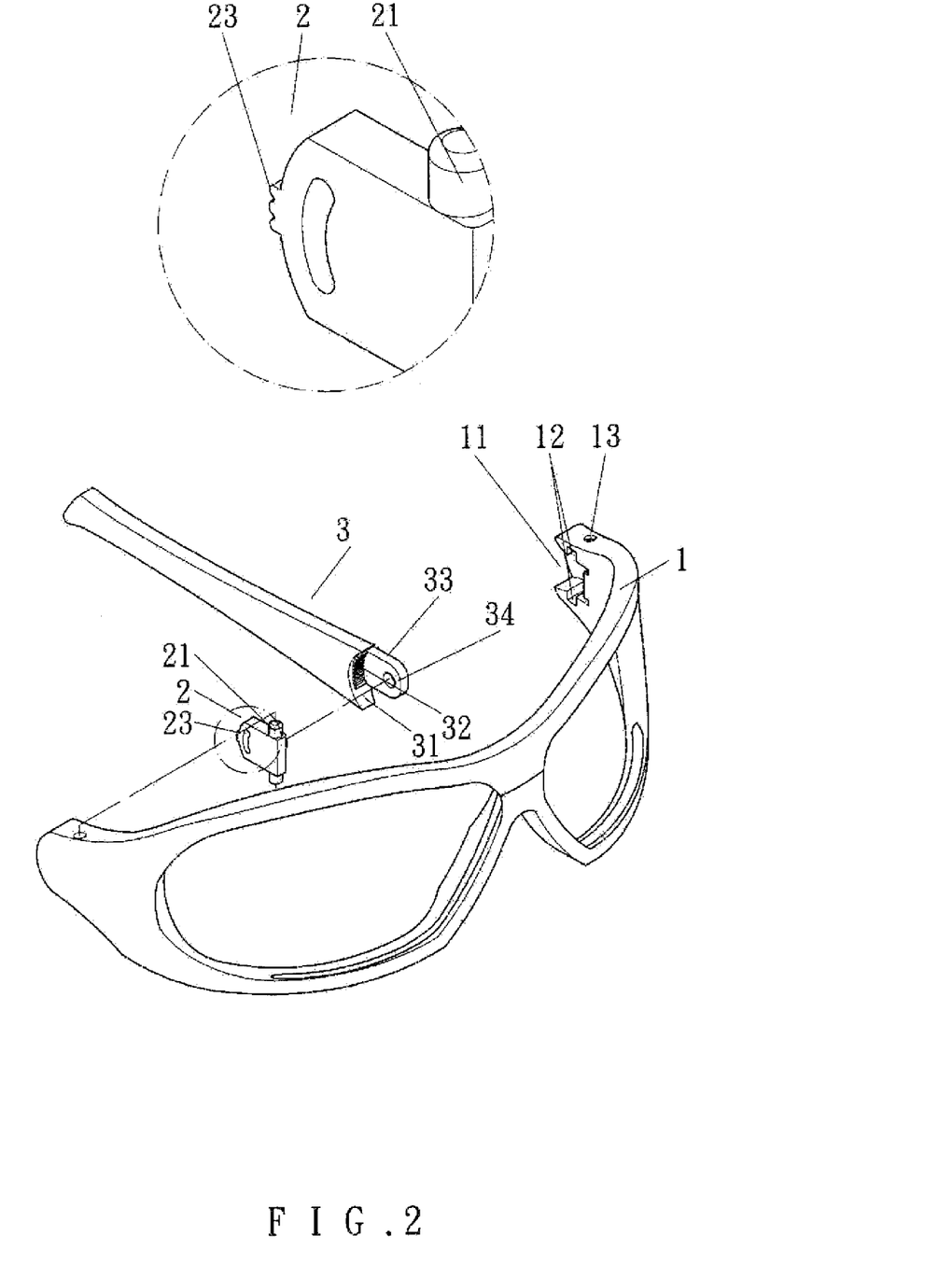
FIG. 2 is another exploded perspective view of the first preferred embodiment.
Figure 3:
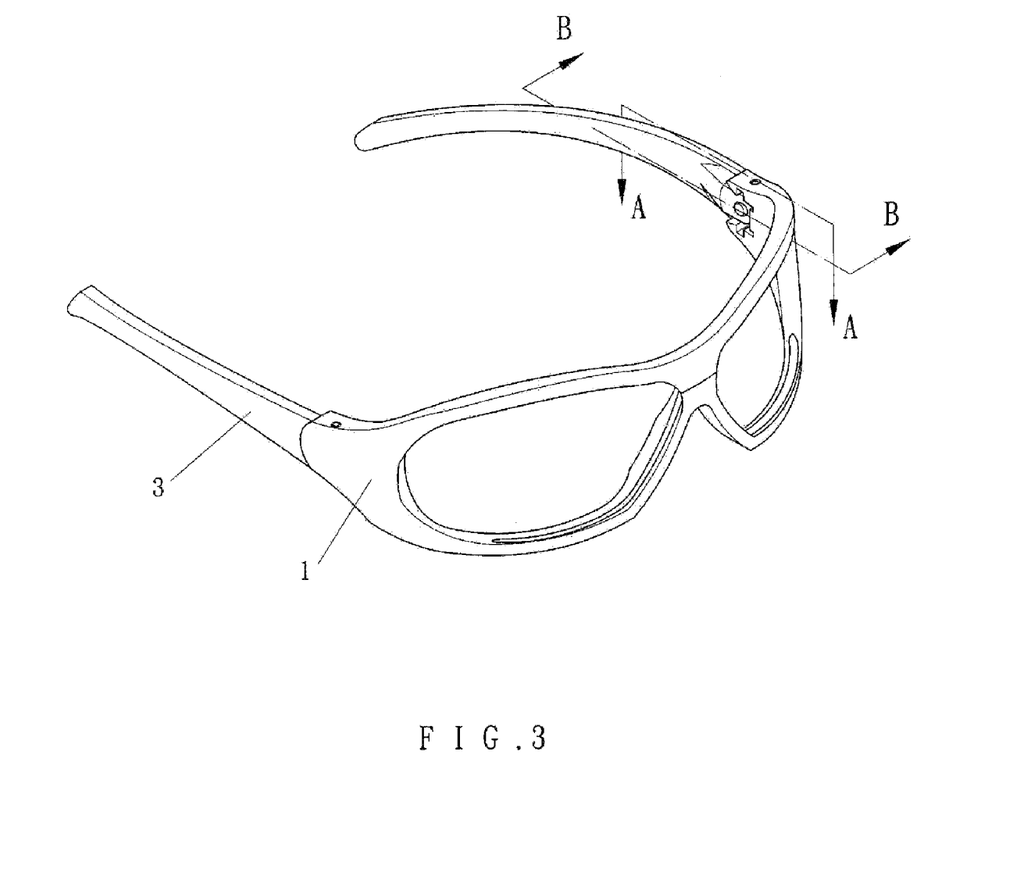
FIG. 3 is an assembly view of the first embodiment.

Referring to FIGS. 1-3, the first preferred embodiment of this invention includes three essential parts: a lens-seat 1, two connecting pieces 2, and two temples 3. In assembly, the upper portion of the temple 3 joins the free end of the lens-seat 1 by the connecting piece 2. To be more specific, the alignment of a free end of the lens-seat 1, the connecting piece 2, and the upper portion of the temple 3 stands along the direction of the lens-seat 1. Such an alignment is a completely different orientation of the connecting piece 2 in relation to the lens-seat 1 and the temple 3, when compared with previous arts. Detailed structures are given below for these three essential parts.

At either free end of the lens-seat 1 is defined a receiving space 11 for housing the connecting piece 2; within the receiving space 11 is further formed the ladder-recess 12, which is configured with through-holes 13 on the upper and lower end wall confining the ladder-recess 12.

On one side of the locking piece 2, the vertical pillar 21 is configured to correspond to the through-holes 13 (disposed on the upper and lower end wall confining ladder-recess 12). In assembly, the vertical pillar 21 is pushed into the through-holes 13 of the ladder-recess 12 by virtue of the resilience of the lens-seat 1. On the side of the connecting piece 2, perpendicular to the longitudinal direction of the vertical pillar 21 and facing towards the temple 3, is disposed a side stud 22 for fixing to the temple 3. The side stud 32 has a larger diameter at the bottom contacting the locking piece 2 than at the top facing outwards. On the opposing side of the vertical pillar 21 is further formed protruding teeth 23 for attaching to the temple 3.

Referring to FIG. 2, a plurality of parallel teeth 32 is formed over the arch surface 31 on the top end of the temple 3. Also on the top end of the temple 3, a retaining piece 33 extends outwards therefrom in a direction parallel to the temple 3. A side hole 34 is configured on the retaining piece 33, corresponding to the side stud 22 of the connecting piece 2. The parallel teeth 32 and the retaining piece 33 are configured in such a way to accommodate the connecting piece 2.

Figure 4:
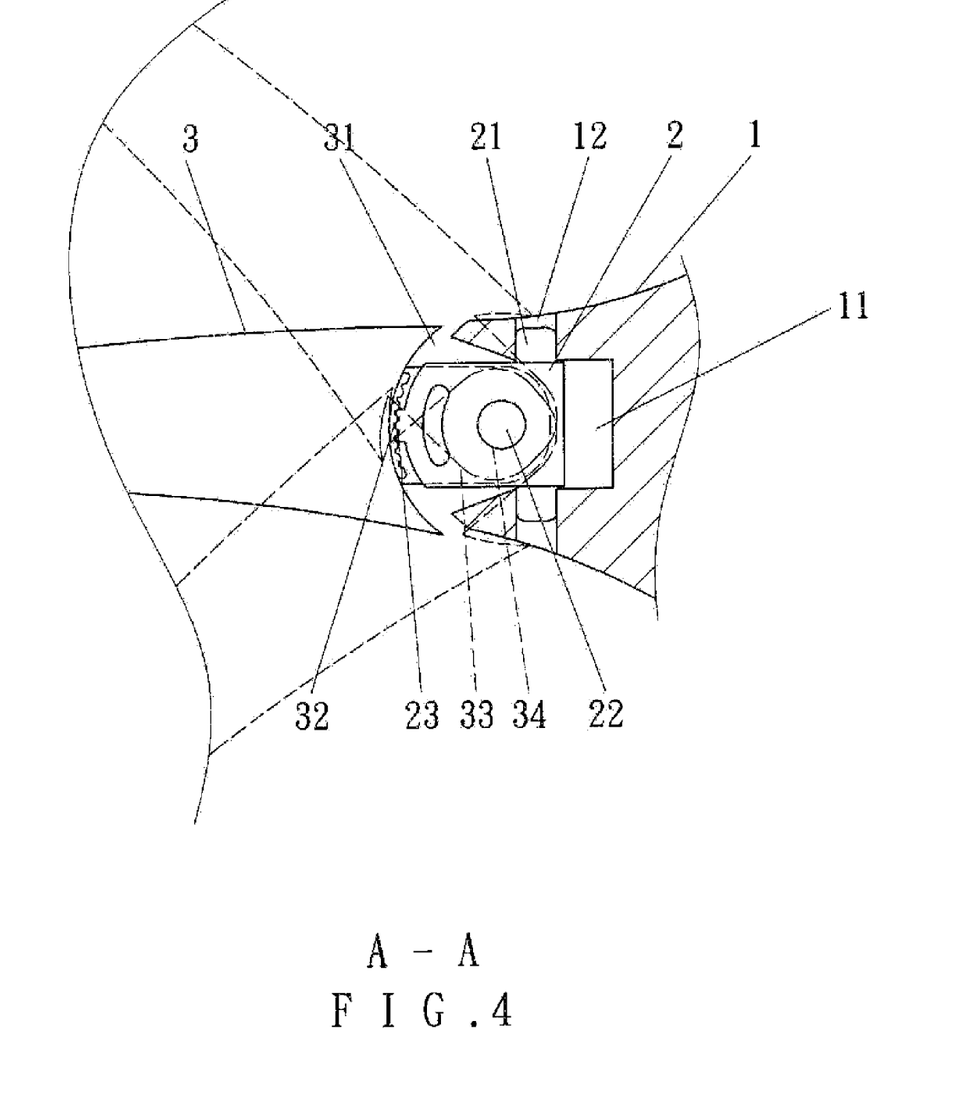
FIG. 4 is cross-sectional side view along the A-A direction of the first preferred embodiment shown in FIG. 3, illustrating rotation of the temple relative to the lens-seat.
Figure 5:
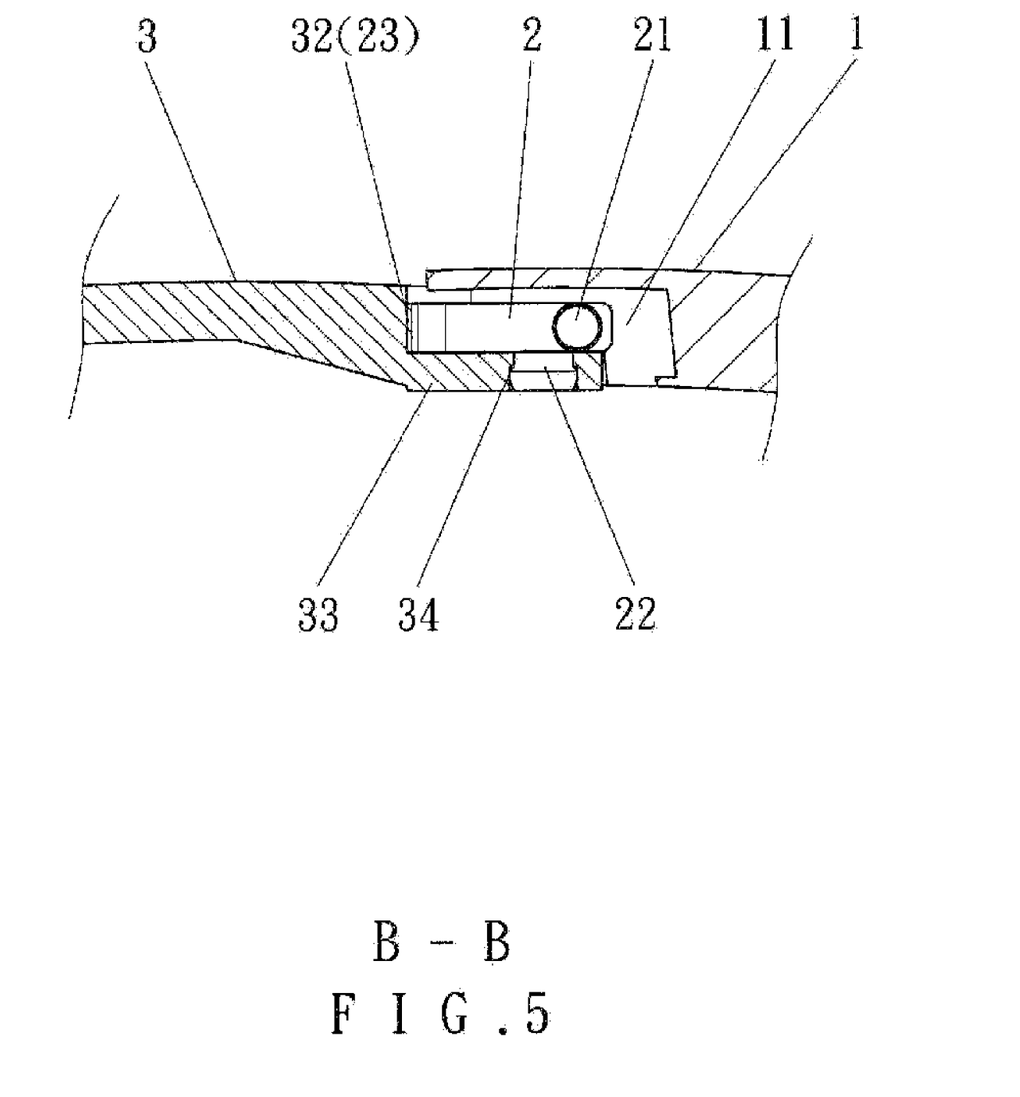
FIG. 5 is cross-sectional side view along the B-B direction of the first preferred embodiment shown in FIG. 3.

Referring to FIGS. 1-5, in assembly, the temple 3 is fixed to the connecting piece 2 by inserting the side stud 22 into the side hole 34; in the meantime, part of the parallel teeth 32 (over the arch surface 31 on the top end of the temple 3) also meshes closely with the protruding teeth 23 (extending outwards from a side of the locking piece 2), as shown by the darkened jagged contact lines of parallel teeth 32 and protruding teeth 23 in FIG. 4. The connecting piece 2 is pushed inside the receiving space 11 (of the lens-seat 1) in such a way that the upper end of the vertical pillar 21 fits into the through-holes 13 of the ladder-recess 12. The whole design facilitates later replacement of a broken temple, a locking piece, or a lens-seat without applying any specially selected tools.

The temple is rotatable relative to the lens-seat 1 via various meshing position between the parallel teeth 32 and the protruding teeth 23, thereby permitting adjustment of an inclination angle of the temple. FIG. 4 shows that the temple 3 can be moved up or down relative to the connecting piece 2 by adjusting the meshing between the protruding teeth 23 (of the connecting piece 2) and a plurality of parallel teeth 32 (of the temple 3). The vertical pillar 21 within the connecting piece 2 acts as a pivot for the temple 3 to fold in and open up. The ladder-recess 12 further improves the security of the vertical pillar 21 within the receiving space 11.

In the present invention, the connecting piece 2 is concealed within the receiving space 11, as well as within the space defined by the arch surface 31 and the retaining piece 33, without marring the outer appearance of the glasses. The invisibility of the locking piece 2 not only reduces its vulnerability in use (as opposed to the situation when exposed outside) but also improves the appealing of the eyeglasses. What distinguishes the present invention most from prior arts lies in the unique alignment of the three essential elements (i.e. the lens-seat 1, the locking piece 2, and the temple 3), which runs in the same direction to that of the lens-seat 1. By virtue of such an orientation of the locking piece 2, the varieties of design in the shape of the temple inevitably increases, further adding to the appealing look of eyeglasses.

Figure 6:
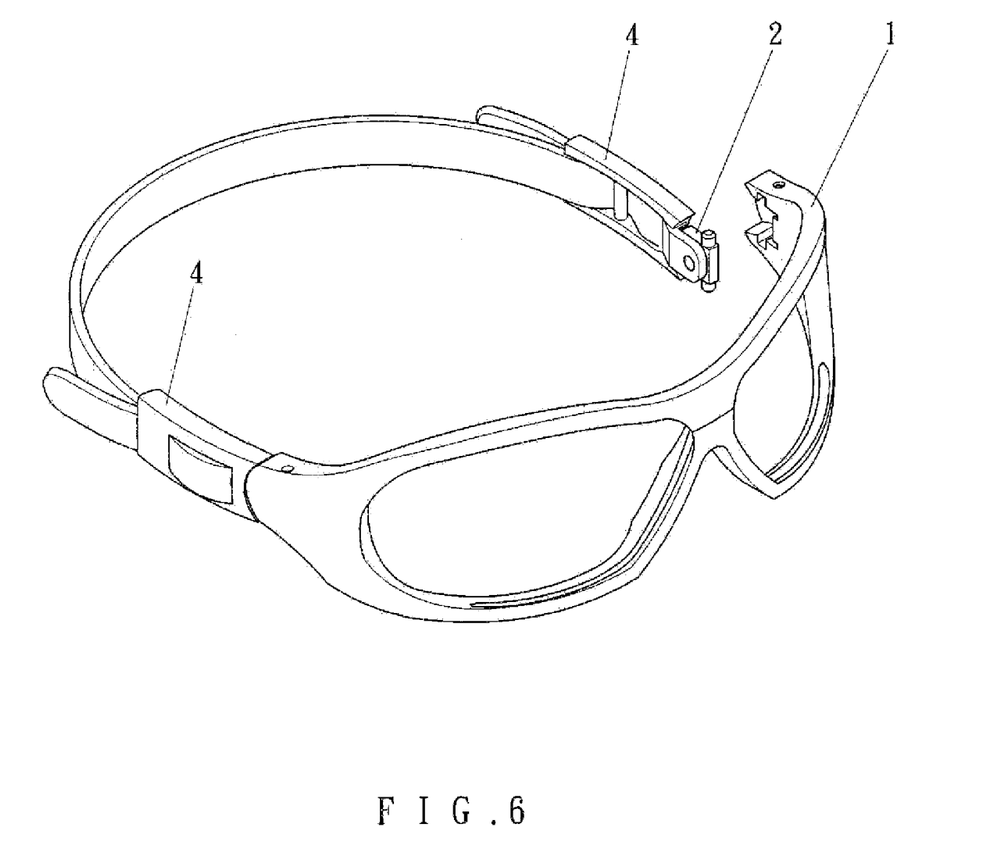
FIG. 6 shows a second preferred embodiment in accordance with this invention with the temple being implemented as a restraining buckle strap.

FIG. 6 shows a second preferred embodiment in accordance with the present invention, which further illustrates the advantage of the unique orientation of the locking piece 2. In FIG. 6, the temple is implemented as a restraining buckle strap 4, removably engaged around the back of the head. The arrangement is adapted for use while engaging in activities which involve the possibility of physical forces.

For simplification, the present invention can be realized without implementing the ladder-recess 12, disposed within the receiving space 11 at the free end of the lens-seat 1. While the present invention has been described in connection with the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A pair of eyeglasses comprising
   a lens-seat defining a receiving space at each free end confined by a top wall, a bottom wall, a side wall facing outwards, and a front wall, wherein said receiving space includes a top through-hole on said top wall and a bottom through-bore on said bottom wall;
   two temple assemblies, each disposed on two opposite ends of said lens-seat, including an accommodation space defined by an arch surface over the top of said temple assembly, and by a retaining piece extending outwards and lengthwise parallel to said temple assembly, wherein a plurality of parallel teeth are formed over said arch surface, and a side hole is formed on said retaining piece; and
   two connecting pieces, each of which includes
      a top pillar and a bottom pillar on opposing sides thereof for fitting into said top through-bore and said bottom through-bore, respectively,
      a side stud facing outwards for inserting into said side hole of said retaining piece of each of said temple assemblies, and
      protruding teeth extending outwards for meshing with said plurality of parallel teeth.

2. The pair of eyeglasses as claimed in claim 1, wherein each of said temple assemblies is integrally formed with a leg for riding on a ear.

3. The pair of eyeglasses as claimed in claim 1, wherein said temple assemblies is a restraining buckle strap, removably engaged around the back of the head.

4. The pair of eyeglasses as claimed in claim 1, wherein within said receiving space of said lens-seat is defined a ladder-recess communicating on the end with said top through-bore and with said bottom through-bore, and a top pillar and a bottom pillar corresponding to said top through-bore and said bottom through-bore, respectively, are configured on the top and bottom of said connecting piece for vertical securing.

5. The pair of eyeglasses as claimed in claim 1, wherein said connecting piece is completely concealed by said lens-seat and by said temple assemblies.

* * * * *